(12) United States Patent
Akashi et al.

(10) Patent No.: US 12,333,064 B2
(45) Date of Patent: Jun. 17, 2025

(54) DISPLAY DEVICE, CARGO UNLOADING SUPPORT SYSTEM, INDUSTRIAL VEHICLE, CONTROL METHOD, AND PROGRAM

(71) Applicant: Mitsubishi Logisnext Co., Ltd., Nagaokakyo (JP)

(72) Inventors: Takuya Akashi, Nagaokakyo (JP); Keisuke Tsukahara, Tokyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 0 days.

(21) Appl. No.: 18/533,670

(22) Filed: Dec. 8, 2023

(65) Prior Publication Data

US 2024/0211026 A1 Jun. 27, 2024

(30) Foreign Application Priority Data

Dec. 22, 2022 (JP) .................. 2022-205735

(51) Int. Cl.
 *G06F 3/01* (2006.01)
 *B66F 9/075* (2006.01)
 *G02B 27/01* (2006.01)

(52) U.S. Cl.
 CPC ............ *G06F 3/011* (2013.01); *B66F 9/0755* (2013.01); *G02B 27/017* (2013.01)

(58) Field of Classification Search
 CPC ... G06T 7/70; G06T 3/40; G06T 2207/30204; G06T 2207/30252; G06T 2207/10016;
 (Continued)

(56) References Cited

U.S. PATENT DOCUMENTS

2004/0098146 A1* 5/2004 Katae ................... B66F 9/24
 340/429
2007/0215412 A1* 9/2007 Fossier ................ B66F 9/0755
 187/222
(Continued)

FOREIGN PATENT DOCUMENTS

| EP | 4 053 071 A1 | 9/2022 |
| JP | 2021-20793 A | 2/2021 |
| WO | WO 2021/216219 A1 | 10/2021 |

*Primary Examiner* — Md Saiful A Siddiqui
(74) *Attorney, Agent, or Firm* — Birch, Stewart, Kolasch & Birch, LLP

(57) ABSTRACT

A display device is a display device worn on a head of a person, the display device including: a display unit having transparency and being capable of displaying image data; a target position acquisition unit acquiring position information of a conveyance destination of a cargo conveyed by an industrial vehicle; a position information acquisition unit acquiring position information of the industrial vehicle; and a control unit displaying the image data including a target placement range of the cargo based on information of a positional relationship between the person boarding the industrial vehicle and the industrial vehicle and the position information of the industrial vehicle and the conveyance destination, and a predicted placement range of the cargo when the cargo is unloaded from the industrial vehicle, the image data being displayed such that the target placement range included in the image data is superimposed on the target placement range in a real world viewable through the display unit.

12 Claims, 12 Drawing Sheets

(58) Field of Classification Search
CPC ........ G06T 2207/30244; G06T 1/0007; G06V
20/56; B66F 9/0755; B66F 9/24; G06F
3/011; G06F 3/012; G06F 3/04815; G06F
3/04817; G06F 1/163; G02B 27/017;
G02B 27/01; G02B 2027/0138; G02B
2027/014; G02B 2027/0141; G02B
2027/0187; G02B 27/0093; G06Q 10/04;
G06Q 10/0631; G06Q 10/0639; G06Q
10/08; G06Q 50/265; G06Q 10/083;
B66C 13/46; B66C 13/48
See application file for complete search history.

(56) References Cited

U.S. PATENT DOCUMENTS

| | | | |
|---|---|---|---|
| 2013/0085646 A1* | 4/2013 | Nishiwaki | B66F 9/24 |
| | | | 701/50 |
| 2014/0188333 A1* | 7/2014 | Friend | E02F 9/261 |
| | | | 701/34.4 |
| 2014/0207615 A1 | 7/2014 | Li et al. | |
| 2015/0199106 A1* | 7/2015 | Johnson | G06F 3/011 |
| | | | 715/740 |
| 2015/0364021 A1* | 12/2015 | Ur | G08B 21/02 |
| | | | 340/573.1 |
| 2017/0038779 A1* | 2/2017 | Fujimori | G05D 1/102 |
| 2018/0218218 A1 | 8/2018 | Madan et al. | |
| 2018/0336514 A1 | 11/2018 | Ranjanghatmuralidhar et al. | |
| 2020/0002143 A1* | 1/2020 | Hasegawa | G05D 1/0246 |
| 2020/0183498 A1 | 6/2020 | West et al. | |
| 2020/0184667 A1 | 6/2020 | Miller et al. | |
| 2020/0278756 A1 | 9/2020 | Holz | |

\* cited by examiner

DISPLAY DEVICE, CARGO UNLOADING SUPPORT SYSTEM, INDUSTRIAL VEHICLE, CONTROL METHOD, AND PROGRAM

CROSS-REFERENCE TO RELATED APPLICATIONS

This application claims the benefit of priority to Japanese Patent Application Number 2022-205735 filed on Dec. 22, 2022. The entire contents of the above-identified application are hereby incorporated by reference.

TECHNICAL FIELD

The disclosure relates to a display device, a cargo unloading support system, an industrial vehicle, a control method, and a program.

RELATED ART

When an operator transports a container with a forklift, the container may block the forward view of the operator. In that case, when loading the container on a container car or the like, the operator once lifts up the container high to secure the forward view, and then approaches a place at which the container is to be unloaded. However, in a state where the container is lifted high, it is difficult for the operator to grasp a placement position and a placement angle at which the container is unloaded, and thus it is difficult to accurately place the container at a target placement position.

As a related technique, JP 2021-20793 A discloses a system including a camera that captures an image in front of a forklift, and a display unit that displays an image obtained by superimposing guide information indicating a distance to and a height of a cargo handling target position on the image captured by the camera.

SUMMARY

There is a need for a technique by which a place at which a cargo is to be placed can be confirmed in advance when the cargo is unloaded regardless of the height of the cargo being conveyed.

The disclosure provides a display device, a cargo unloading support system, an industrial vehicle, a control method, and a program that can solve the above problem.

A display device according to the disclosure is a display device worn on a head of a person, the display device including: a display unit having transparency and being capable of displaying image data: a target position acquisition unit acquiring target position information, the target position information being position information of a conveyance destination of a cargo conveyed by an industrial vehicle: a position information acquisition unit acquiring vehicle position information, the vehicle position information being position information of the industrial vehicle or the person boarding the industrial vehicle: and a control unit displaying the image data, the image data including a target placement range of the cargo as viewed from the person based on information of a positional relationship between the person boarding the industrial vehicle and the industrial vehicle, the vehicle position information, and the target position information, and a predicted placement range of the cargo when the cargo is unloaded from the industrial vehicle as viewed from the person based on the information of the positional relationship, information of a position at which the industrial vehicle holds the cargo, and information of a size of the cargo, the image data being displayed such that the target placement range included in the image data is superimposed on the target placement range in a real world viewable through the display unit.

A cargo unloading support system according to the disclosure includes: a positioning device measuring position information of the industrial vehicle or the person boarding the industrial vehicle: and the display device described above.

An industrial vehicle according to the disclosure includes the cargo unloading support system described above.

A control method according to the disclosure is a control method for a display device worn on a head of a person, the display device including a display unit, the display unit having transparency and being capable of displaying image data, the control method including: a step of acquiring target position information, the target position information being position information of a conveyance destination of a cargo conveyed by an industrial vehicle: a step of acquiring vehicle position information, the vehicle position information being position information of the industrial vehicle or the person boarding the industrial vehicle: and a step of displaying the image data, the image data including a target placement range of the cargo as viewed from the person based on information of a positional relationship between the person boarding the industrial vehicle and the industrial vehicle, the vehicle position information, and the target position information, and a predicted placement range of the cargo when the cargo is unloaded from the industrial vehicle as viewed from the person based on the information of the positional relationship, information of a position at which the industrial vehicle holds the cargo, and information of a size of the cargo, the image data being displayed such that the target placement range included in the image data is superimposed on the target placement range in a real world viewable through the display unit.

A program according to the disclosure is a program for a computer of a display device worn on a head of a person, the display device including a display unit, the display unit having transparency and being capable of displaying image data, the program causing the computer to function as: a unit configured to acquire target position information, the target position information being position information of a conveyance destination of a cargo conveyed by an industrial vehicle: a unit configured to acquire vehicle position information, the vehicle position information being position information of the industrial vehicle or the person boarding the industrial vehicle; and a unit configured to display the image data, the image data including a target placement range of the cargo as viewed from the person based on information of a positional relationship between the person boarding the industrial vehicle and the industrial vehicle, the vehicle position information, and the target position information, and a predicted placement range of the cargo when the cargo is unloaded from the industrial vehicle as viewed from the person based on the information of the positional relationship, information of a position at which the industrial vehicle holds the cargo, and information of a size of the cargo, the image data being displayed such that the target placement range included in the image data is superimposed on the target placement range in a real world viewable through the display unit.

According to the display device, the cargo unloading support system, the industrial vehicle, the control method, and the program described above, a place at which a cargo having been conveyed by the industrial vehicle is to be placed can be confirmed in advance when the cargo is unloaded.

BRIEF DESCRIPTION OF DRAWINGS

The disclosure will be described with reference to the accompanying drawings, wherein like numbers reference like elements.

DESCRIPTION OF EMBODIMENTS

Embodiments

Figure 1:
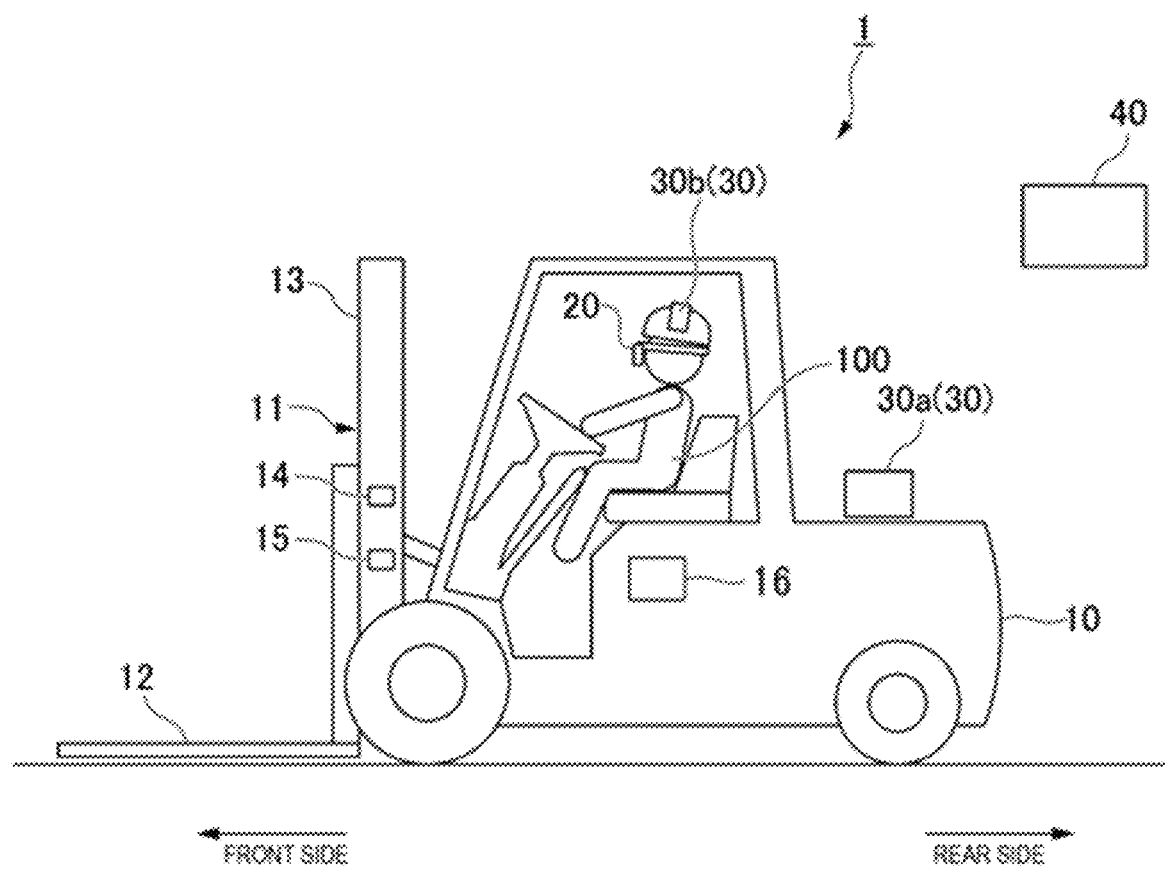
FIG. 1 is a schematic diagram illustrating an example of a forklift according to an embodiment.

A cargo unloading support system of the disclosure will be described below with reference to the drawings.
Configuration
FIG. 1 is a schematic diagram illustrating an example of a forklift according to each embodiment.

A forklift 1 includes a vehicle body 10, a cargo handling device 11, a route calculation device 16, and a display device 20. The vehicle body 10 includes a driving device (not illustrated) and a steering device, and causes the forklift 1 to travel. The cargo handling device 11 includes a fork 12 and a mast 13 that lifts and lowers the fork 12, and performs a cargo handling operation by lifting and lowering a cargo loaded on the fork 12. The mast 13 is provided with an inclination sensor 14, and the inclination sensor 14 detects the inclination (tilt angle) of the mast 13. The mast 13 is provided with a load sensor 15, and the load sensor 15 detects the weight of a cargo loaded on the fork 12. Values measured by the inclination sensor 14 and the load sensor 15 are transmitted to the display device 20. The vehicle body 10 or the like is provided with a GNSS 30 which is a receiver (mobile station) of a global navigation satellite system (GNSS) that measures the position of the forklift 1. For example, the GNSS 30 (30a in FIG. 1) may be provided at any position of the vehicle body 10, or the GNSS 30 (30b in FIG. 1) may be provided at a 20 helmet or the like worn by a driver 100. Either one of the GNSS 30a and 30b may be provided. In the following description, it is assumed that the GNSS 30a is mounted at the vehicle body 10 as an example. Position information measured by the GNSS 30a is transmitted to the display device 20. The display device 20 is AR glasses or mixed reality (MR) glasses. The driver 100 wears the display device 20 and drives the forklift 1. In this specification, as illustrated in FIG. 1, a side on which the cargo handling device 11 of the forklift 1 is provided is referred to as a front side, an opposite side is referred to as a rear side, and left and right sides when facing the front side are referred to as a left side and a right side, respectively. In addition, a management system 40 that manages a cargo such as a container to be handled by the forklift 1 is provided at an office, a data center, or the like in a site where a cargo handling work is performed.

Figure 2:
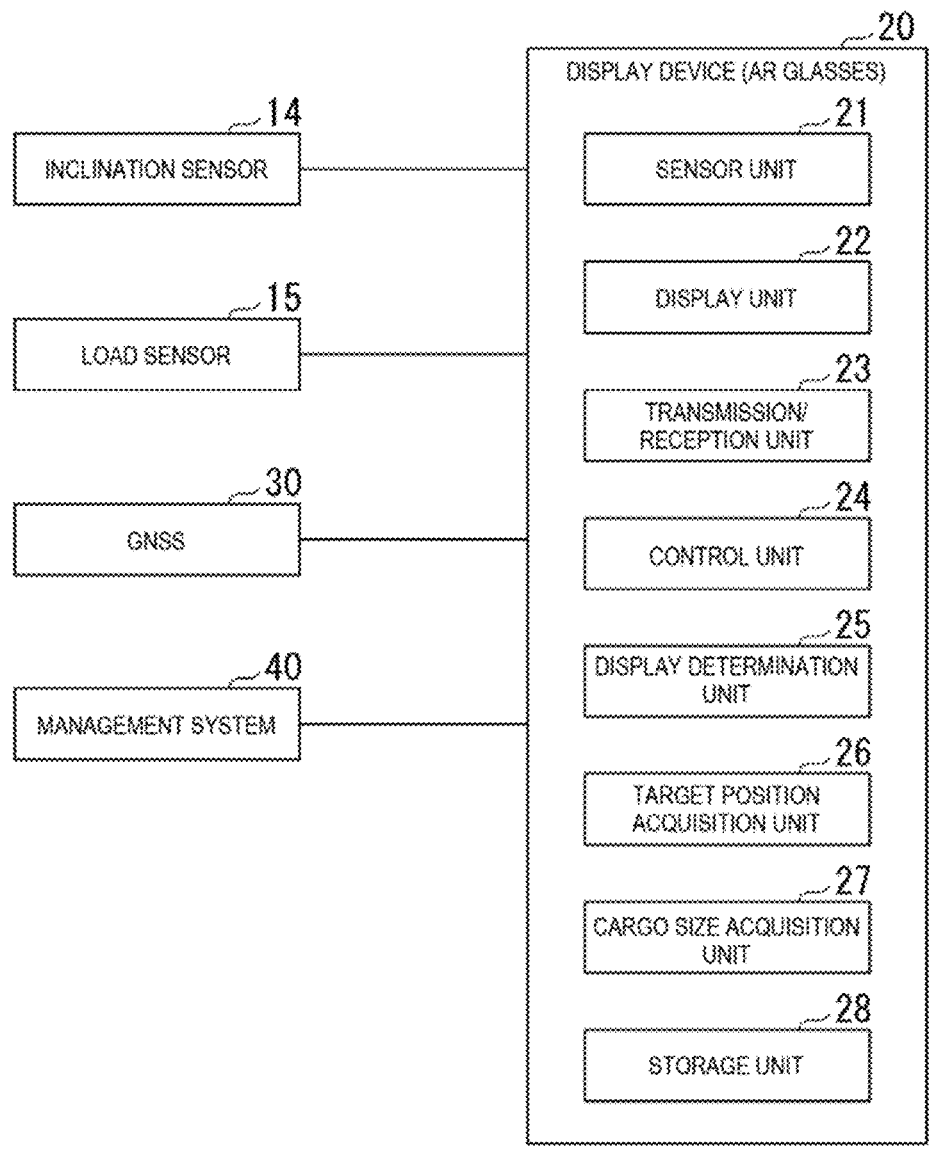
FIG. 2 is a block diagram illustrating an example of a display device according to the embodiment.

FIG. 2 is a block diagram illustrating an example of a cargo unloading support system according to the embodiment.

A cargo unloading support system 200 includes the inclination sensor 14, the load sensor 15, the display device 20, the GNSS 30, and the management system 40. The inclination sensor 14, the load sensor 15, and the GNSS 30 are communicably connected to the display device 20. The display device 20 and the management system 40 are communicably connected to each other. The management system 40 includes a computer. The display device 20 is AR glasses or MR glasses including a display device and a computer (hereinafter, collectively referred to as AR glasses).
Configuration of Management System The management system 40 manages, for each container to be handled, the size of the container and the position information of a target position at which the container is to be placed. For example, when the forklift 1 conveys a container, the management system 40 transmits the position information of a target position, which is a conveyance destination of the container, to the display device 20. The target position may be, for example, the position information of the four corners of a rectangular range in which the container is to be placed, or the information that determines the position of a center of gravity of the rectangular range and the orientation or angle at which the container is placed. In addition, the management system 40 may transmit the information of a size such as a length, a width, or a height of the container being conveyed to the display device 20 together with the target position.
Configuration of Display Device The display device 20 includes a sensor unit 21, a display unit 22, a transmission/reception unit 23, a control unit 24, a display determination unit 25, a target position acquisition unit 26, a cargo size acquisition unit 27, and a storage unit 28.

The sensor unit 21 includes a sensor for head tracking of the driver 100 (for example, a plurality of visible light cameras or an IMU), a sensor for eye tracking of the driver 100 (for example, an infrared camera), a depth sensor, a microphone, and the like.

The display unit 22 constitutes a lens (screen) portion of the AR glasses, and includes, for example, a transparent holographic display (through which the outside world can be seen). In a state where no virtual object is projected on the lens, the driver 100 can see the real world directly. The virtual object is image data projected on the display unit 22.

When the virtual object is displayed on the display unit 22, the driver 100 sees the virtual object superimposed on the real world.

The transmission/reception unit 23 communicates with other devices. For example, the transmission/reception unit 23 receives values measured by the inclination sensor 14, the load sensor 15, and the GNSS 30 through wireless communication such as Wi-Fi (registered trademark) or Bluetooth (registered trademark). Further, the transmission/reception unit 23 acquires information such as a target position at which a container is to be placed from the management system 40.

The control unit 24 performs display control and the like of the display unit 22. Based on the information detected by the sensor unit 21, the control unit 24 recognizes a spatial configuration around the driver 100, and determines, for example, a position of the driver 100 on a driver's seat and a posture of the driver 100. The control unit 24 generates a virtual space (vehicle virtual space) corresponding to the forklift 1 and a space therearound based on the three dimensional CAD information of the forklift 1, and generates a virtual space (site virtual space) corresponding to a space outside the forklift 1 and the space therearound covered by the vehicle virtual space, that is, corresponding to a space representing a site in which a cargo handling work is to be performed, based on preliminarily created three dimensional map information of the site in which the cargo handling work is to be performed. The control unit 24 conducts calibration to perform alignment between the real world, the vehicle virtual space, and the site virtual space. In a state where the alignment has been performed, the control unit 24 arranges a virtual object at a desired position in the vehicle virtual space. Then, the virtual object is displayed to the driver 100 as if being actually present at a position in the real world corresponding to the desired position in the vehicle virtual space. For example, the virtual object is a "predicted placement range" indicating a range to be occupied by a container on the assumption that the container being conveyed is immediately lowered in the vertical direction and placed on the ground. The predicted placement range is generated as, for example, a thin cubic virtual object. The predicted placement range can be displayed at an arbitrary position with reference to a container loaded on the fork 12 (for example, near a bottom surface of the container, between the bottom surface of the container and the ground, or the like). In addition, even when there is an obstacle blocking a field of view of the driver 100 between the driver 100 and a virtual object, the predicted placement range can be displayed so as to be visible through the obstacle. Further, even when there is an obstacle blocking a field of view of the driver 100 between the driver 100 and the predicted placement range, the predicted placement range can be displayed as if being present on an opposite side of the obstacle when viewed from the driver 100 (occlusion). The control unit 24 arranges a virtual object at a desired position in the site virtual space. Then, the virtual object is displayed to the driver 100 as if being actually present at a position in the real world corresponding to the desired position in the site virtual space. For example, the virtual object is a "target placement range" indicating a range in which a container being conveyed is to be placed. The target placement range is generated as, for example, a thin cubic virtual object. A virtual object "target placement range" can be displayed, for example, at an arbitrary position with reference to a target position of the container. The target placement range can also be preferentially displayed through an obstacle between the driver 100 and the target position, or can be displayed so as to be blocked by the obstacle. Based on the information detected by the sensor unit 21, the control unit 24 calculates a position of the head of the driver 100 when the driver 100 takes a posture such as bending down or leaning out from the driver's seat in the left-right direction. Then, the control unit 24 generates virtual objects of the predicted placement range and the target placement range such that the predicted placement range and the target placement range appear to be the same as those actually present in the real world based on the positional relationship between the head of the driver 100 and the virtual objects, and arranges the virtual objects in a virtual space. Accordingly, for example, even when the driver 100 leans to a right side from the driver's seat during a cargo handling work, the "predicted placement range" and the "target placement range" are displayed so as to be visible from the right side.

Figure 3A:
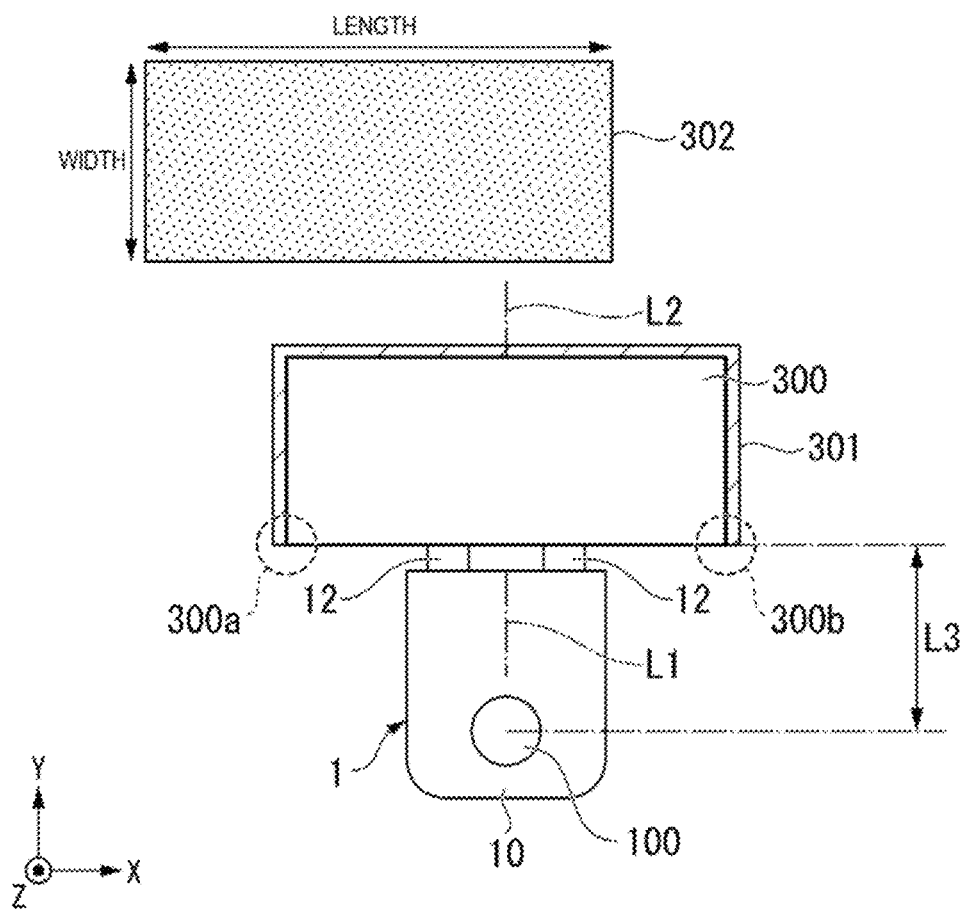
FIG. 3A is a first diagram for explaining a display of a predicted placement range and a target placement range according to the embodiment.

The functions of the AR glasses include freely arranging a virtual object, arranging a virtual object "predicted placement range" at a desired position in the vehicle virtual space and arranging a "target placement range" at a desired position in the site virtual space such that these virtual objects appear as if being present at the respective positions in the real world, and changing how a virtual object is seen in accordance with the posture of the driver 100. A user makes settings related to a desired virtual object on the display device 20 (a developer develops a virtual object using an AR development tool and implements a developed program on the display device 20). Then, the control unit 24 arranges the virtual object at a desired position according to the settings. In the present embodiment, the control unit 24 generates a "predicted placement range" and a "target placement range" and arranges them in respective virtual spaces. For example, in the case of the "predicted placement range", as illustrated in FIG. 3A, the control unit 24 generates a predicted placement range 301 based on the size (length and width) of a container 300 acquired by the cargo size acquisition unit 27, and arranges the predicted placement range 301 at a position where a center L1 between the left and right forks 12 and a center L2 of the predicted placement range 301 in a longitudinal direction are aligned in an X-axis direction of an XY plane in the vehicle virtual space, and a near side of the predicted placement range 301 as viewed from the driver 100 is placed at a predetermined distance L3 from the driver 100 in a Y-axis direction. Further, in a Z-axis direction of an XYZ space in the vehicle virtual space, the control unit 24 arranges the predicted placement range 301 at a position of a predetermined height HI from the ground in the vehicle virtual space as illustrated in FIG. 3B.

Figure 3B:
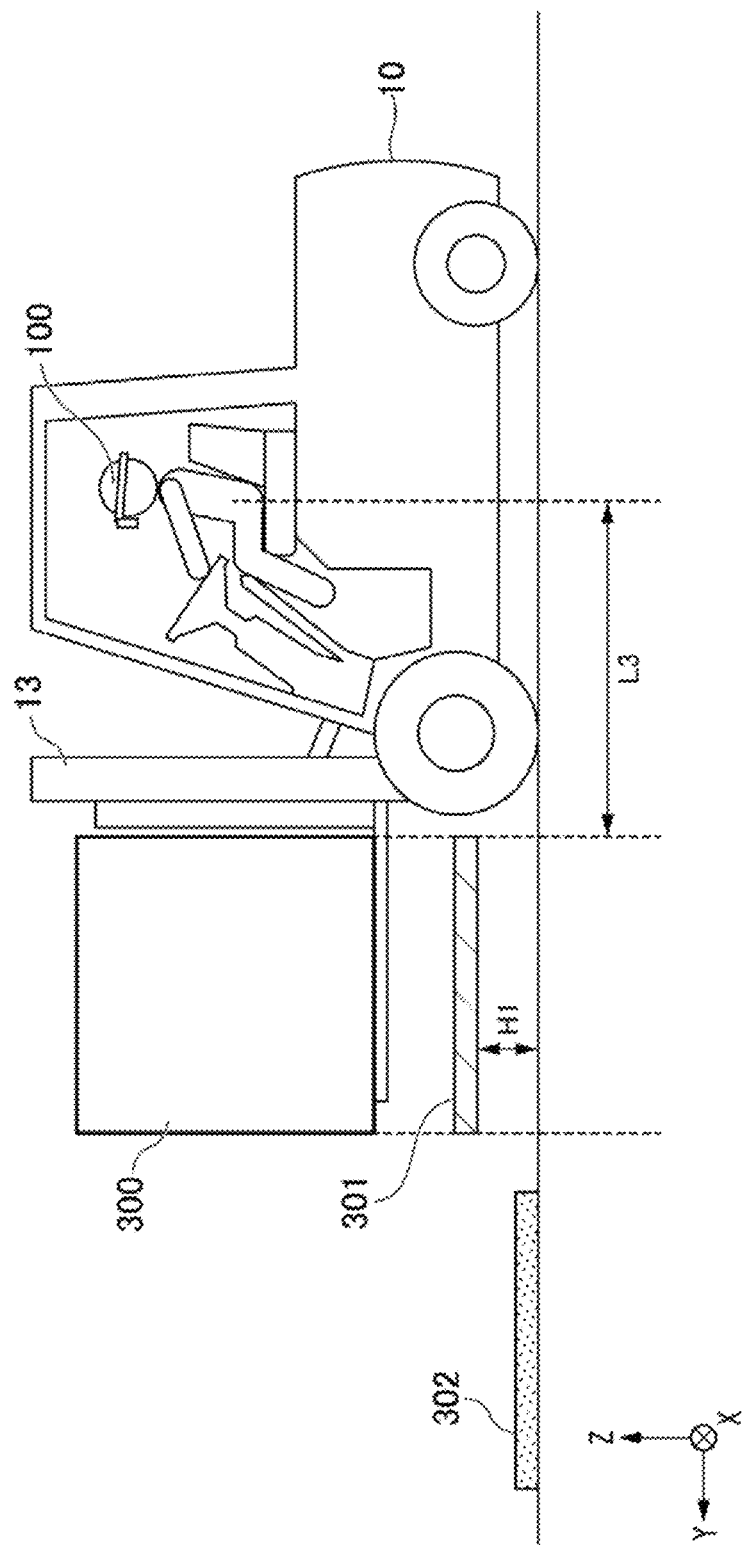
FIG. 3B is a second diagram for explaining a display of the predicted placement range and the target placement range according to the embodiment.

For example, in the case of the "target placement range", the control unit 24 generates a target placement range 302 based on the size (length and width) of the container 300 acquired by the cargo size acquisition unit 27, and arranges the target placement range 302 such that the target placement range 302 is placed, for example, to fit in a range defined by a target position specified by the management system 40 on an XY plane in the site virtual space as illustrated in FIG. 3A and that the target placement range 302 is placed, for example, at a height at which a bottom surface of the target placement range 302 comes in contact with the ground in a Z-axis direction in the site virtual space as illustrated in FIG. 3B.

Figure 4:
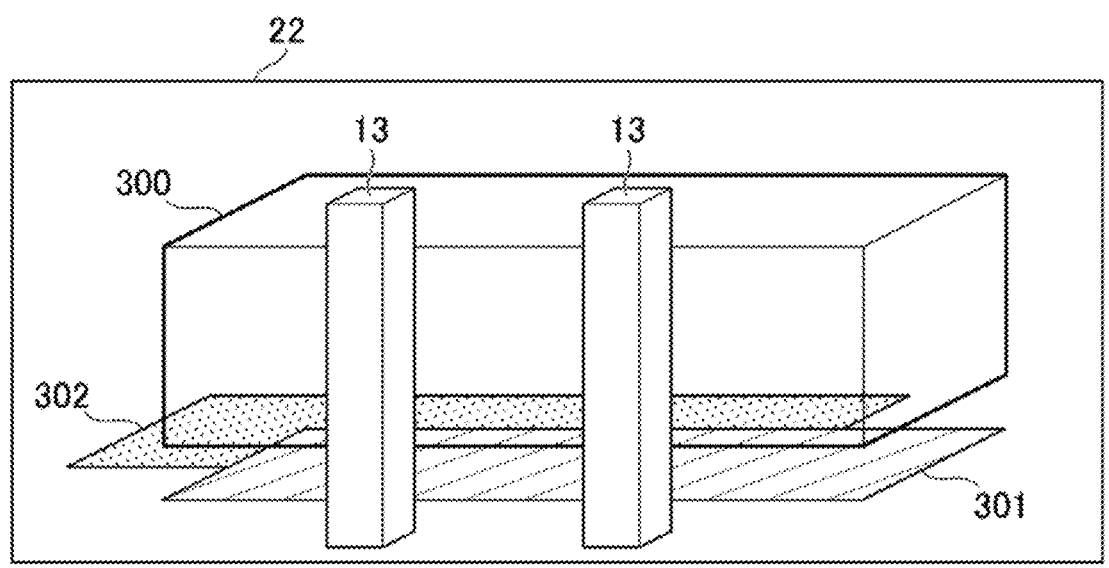
FIG. 4 is a diagram illustrating a display example of the predicted placement range and the target placement range according to the embodiment.
Figure 5:
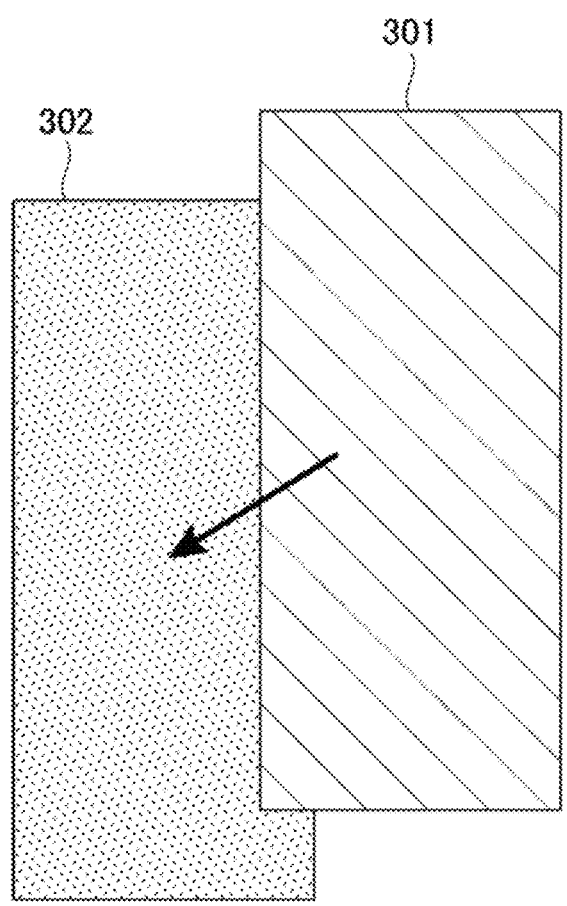
FIG. 5 is a diagram for explaining an operation of superimposing the predicted placement range and the target placement range according to the embodiment.

FIG. 4 illustrates an example (schematic diagram) of visual information viewable by the driver 100 through the display device 20 when the "predicted placement range" and the "target placement range" are arranged in the vehicle virtual space and the site virtual space, respectively. While checking the positional relationship between the predicted placement range 301 at which the container 300 is to be placed if the container 300 is immediately unloaded at a current vehicle position and the target placement range 302 at which the container 300 is to be unloaded, the driver 100 can operate the forklift 1 such that the predicted placement range 301 and the target placement range 302 overlap with each other, thereby placing the container 300. For example, when the positional relationship between the predicted placement range 301 and the target placement range 302 is as illustrated in FIG. 4, the driver 100 operates the forklift 1 to move the container 300 in the arrow direction illustrated in FIG. 5. In addition, the control unit 24 displays the predicted placement range 301, the target placement range 302, and a region in which they overlap each other in such a manner as to be easily visible. For example, the control unit 24 may display the target placement range 302 in a blue-based color such as sky blue, display the predicted placement range 301 in a red-based color such as pink, and display the region in which they overlap each other in light purple or the like. Accordingly, the driver 100 can easily grasp the degree of overlapping between the predicted placement range 301 and the target placement range 302.

The mast 13 may be tilted in the front-back direction during conveyance of the container 300. In that case, the control unit 24 may display the predicted placement range when the bottom surface of the container 300 becomes parallel to the ground. Alternatively, the control unit 24 may change the color of the predicted placement range when the bottom surface of the container 300 becomes parallel to the ground. Accordingly, the driver 100 can place the container 300 while confirming that the container 300 is not tilted. The controller 24 may determine that the bottom surface of the container 300 is parallel to the ground based on, for example, a value detected by the inclination sensor 14 provided at the mast 13.

Figure 6:
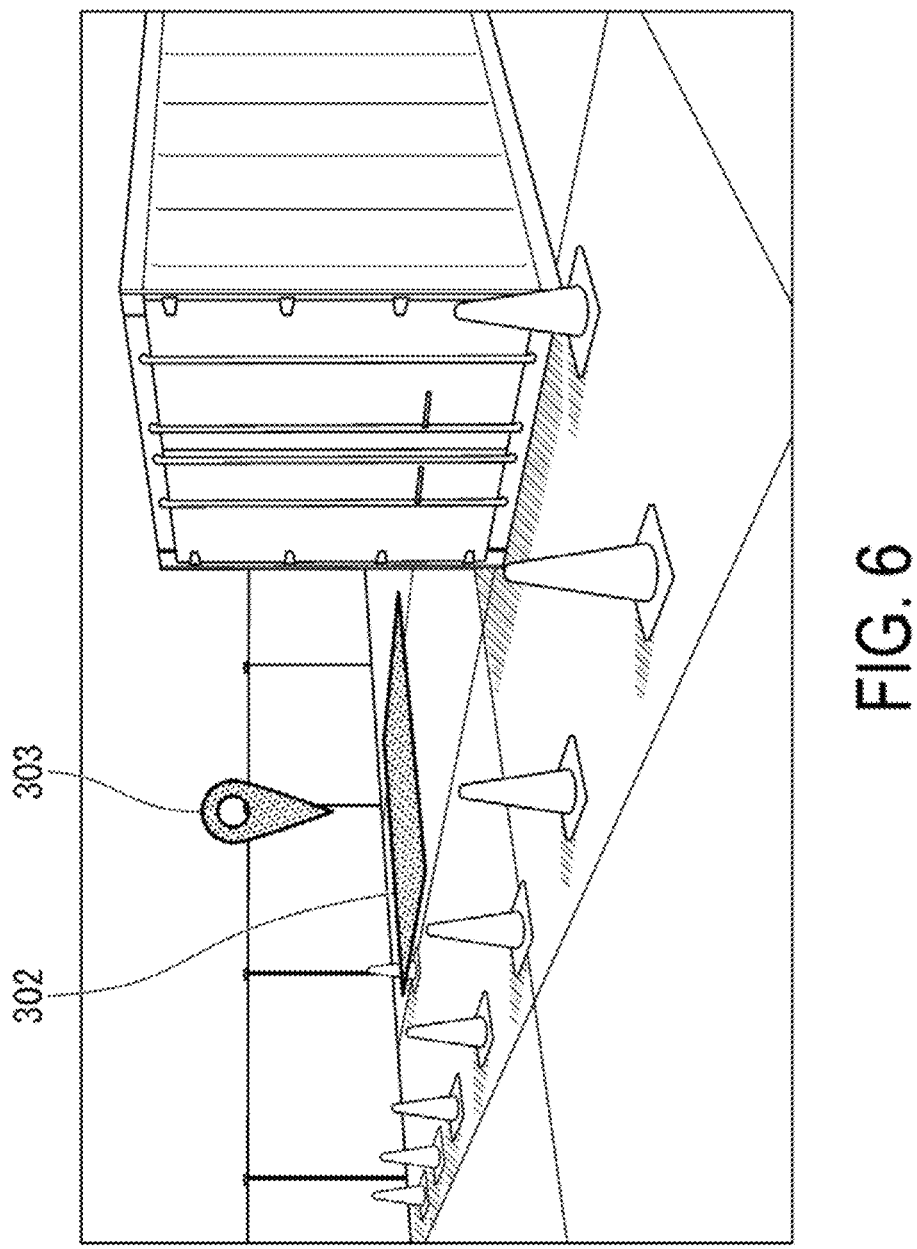
FIG. 6 is a diagram illustrating an example of a display for giving a guidance to a target position according to the embodiment.

In addition, for example, in a case where the forklift 1 and a target position are away from each other, the control unit 24 may perform only display for giving a guidance to the target position without displaying the predicted placement range 301 because displaying the predicted placement range 301 becomes an obstacle. For example, the control unit 24 may arrange a virtual object 303 serving as a landmark at a position corresponding to the target position in the site virtual space, above that position, or the like, or may arrange the target placement range 302. FIG. 6 illustrates a display example of the target placement range 302 and the virtual object 303. The image in FIG. 6 is an example of visual information viewable by driver 100 through display unit 22. The driver 100 can cause the forklift 1 to approach the target position using the target placement range 302 and the virtual object 303 as landmarks. In this way, the control unit 24 switches between displaying and hiding a virtual object to be displayed on the display unit 22. For example, in a situation in which the predicted placement range 301 and the target placement range 302 become obstacles, they can be hidden.

The display determination unit 25 determines whether to display or hide a virtual object. When the display determination unit 25 determines to display a certain virtual object, the control unit 24 displays (arranges) the virtual object, and when the display determination unit 25 determines to hide the virtual object, the control unit 24 hides the virtual object (does not arrange the virtual object in a virtual space). An example of the determination process of the display determination unit 25 will be described below:

(A) The display determination unit 25 acquires information detected by the load sensor 15 (a weight of a cargo loaded on the fork 12) through the transmission/reception unit 23. The display determination unit 25 determines to display the predicted placement range 301, the target placement range 302, and the virtual object 303 for giving a guidance to a target position when the weight detected by the load sensor 15 is equal to or greater than a predetermined threshold value (that is, when the container 300 is held), and determines to hide the predicted placement range 301 when the weight is less than the threshold value. When the weight is less than the threshold value, the display determination unit 25 may determine to hide the target placement range 302 and the virtual object 303.

(B) The display determination unit 25 acquires information of a current position of the forklift 1 measured by the GNSS 30a through the transmission/reception unit 23. The display determination unit 25 calculates a distance from the current position of the forklift 1 to the target position, determines to hide the predicted placement range 301 or hide the predicted placement range 301 and the target placement range 302 (for example, while displaying the virtual object 303) when the calculated distance is equal to or greater than a predetermined threshold value, and determines to display the predicted placement range 301 and the target placement range 302 and hide the virtual object 303 when the distance is less than the threshold value.

(C) The control unit 24 displays an operation panel (virtual object) in the vehicle virtual space based on, for example, a gesture, voice, or the like of the driver 100. The operation panel is provided with a virtual switch for switching between displaying and hiding each virtual object. When the driver 100 instructs to display a virtual object by operating the virtual switch related to the virtual object, the display determination unit 25 determines to display the virtual object. When the driver 100 instructs to hide a virtual object by operating the virtual switch of the virtual object, the display determination unit 25 determines to hide the virtual object. As described above, a technique that enables an operation to be performed on the operation panel displayed in the vehicle virtual space can be realized by MR.

The display determination unit 25 may determine whether to display or hide a virtual object by combining (A) to (C) above. For example, when the display determination unit 25 determines to display a virtual object by (B) and subsequently the driver 100 operates a virtual switch to instruct to hide the virtual object, the display determination unit 25 determines to hide the virtual object.

The target position acquisition unit 26 acquires information about a target position at which the container 300 is to be placed. For example, when a container 300A is loaded on the fork 12, the target position acquisition unit 26 acquires information about a target position of the container 300A from the management system 40 through the transmission/reception unit 23. For example, when the driver 100 inputs that the container 300A has been loaded from the operation panel in the vehicle virtual space and transmits the input information to the management system 40 through the transmission/reception unit 23, the target position of the container 300A may be transmitted from the management system 40 to the display device 20. Alternatively, there may be a configuration in which a predetermined camera captures an image of the container 300A that has been loaded on the forklift 1, the management system 40 analyzes the captured image to grasp which forklift transports which container, and transmits the target position corresponding to the container 300A to the display device 20 worn by the driver 100 of the forklift 1. The target position acquisition unit 26 records information about the acquired target position in the storage unit 28.

The cargo size acquisition unit 27 acquires information about the size such as a length, a width, and a height of the container 300 being conveyed. The length is a length in the longitudinal direction of the container 300 being conveyed as viewed from the driver 100, the width is a length in the depth direction of the container 300 being conveyed as viewed from the driver 100, and the height is a length in the vertical direction. For example, several types of container sizes may be registered in advance in the storage unit 28, and the cargo size acquisition unit 27 may acquire the information about a size selected from the several types of container sizes by the driver 100 using an operation panel in the virtual space or the like. Alternatively, the cargo size acquisition unit 27 may acquire the information about the size of the container 300 from the management system 40 through the transmission/reception unit 23. Still alternatively, when the driver 100 looks at both ends (300a and 300b in FIG. 3A) of the container 300, the depth sensor of the sensor unit 21 may measure a distance from the driver 100 to the both ends of the container 300, and the cargo size acquisition unit 27 may estimate the size of the container 300 based on the measurement result. For example, the cargo size acquisition unit 27 selects a container size closest to the measurement result from among several types of container sizes registered in advance, and sets the value of the selected container size as the size of the container 300. The cargo size acquisition unit 27 records the information about the acquired or estimated size in the storage unit 28.

Figure 7A:
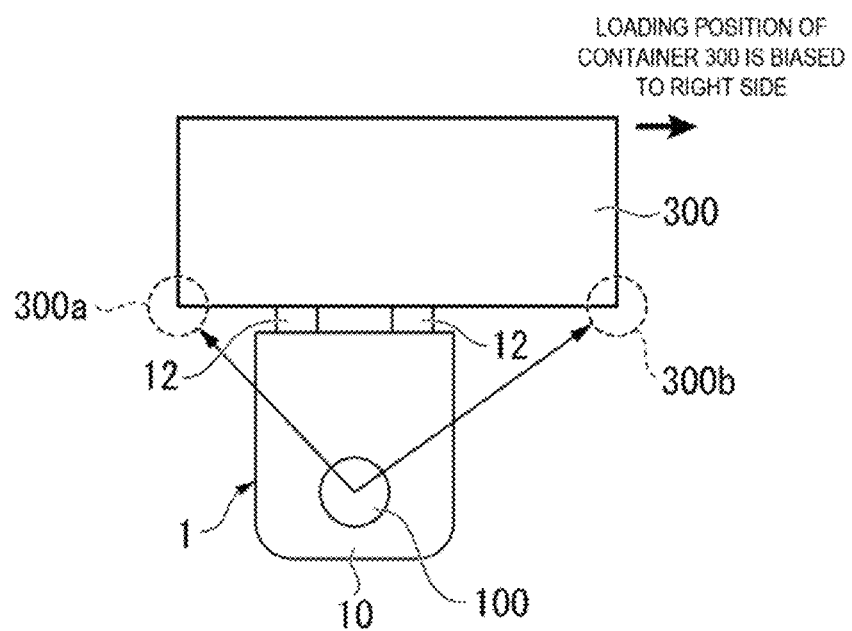
FIG. 7A is a first diagram illustrating an example of loading of a container according to the embodiment.
Figure 7B:
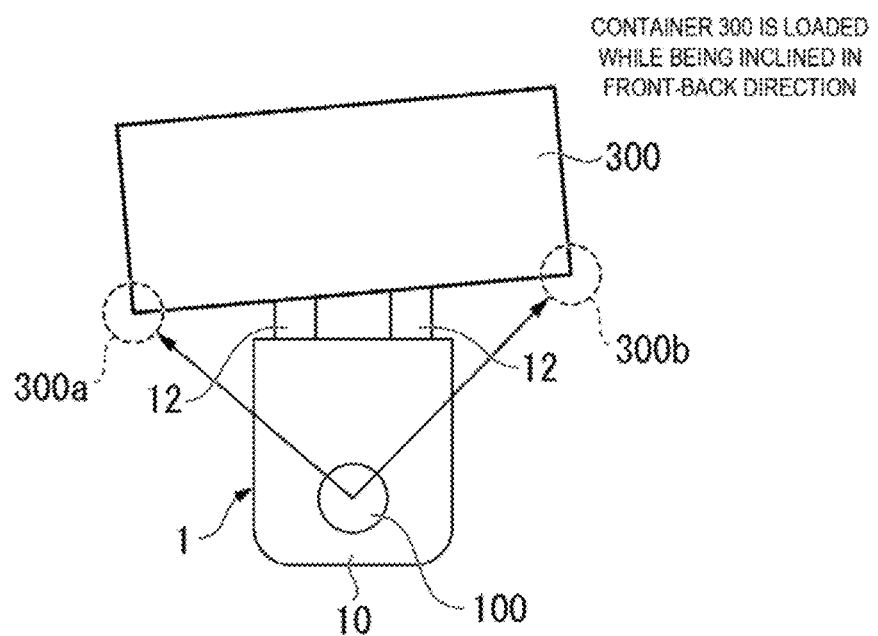
FIG. 7B is a second diagram illustrating an example of loading of a container according to the embodiment.

When the cargo size acquisition unit 27 estimates the size of the container 300, the positional relationship between the driver 100 and the both ends (300a and 300b in FIG. 3A) of the container 300 may be output to the control unit 24, and the control unit 24 may arrange the predicted placement range 301 based on this information. For example, the container 300 may be held biasedly to the right as illustrated in FIG. 7A, or may be inclined in the front-back direction as illustrated in FIG. 7B. Despite this situation, when the predicted placement range 301 is arranged on the assumption that the container 300 is loaded straight without being biased to the left or right, a range in which the container 300 is actually placed and the predicted placement range 301 depart from each other. Therefore, based on the positions of the both ends of the container 300 estimated by the cargo size acquisition unit 27, the control unit 24 arranges the predicted placement range 301 so as to reproduce the accurate position and angle at which the container 300 is placed.

The storage unit 28 stores information detected by the sensor unit 21, information received by the transmission/reception unit 23, CAD information of the forklift 1 or forklifts of various vehicle types, and the like. Map information or the like of a site in which a cargo handling work is performed is also stored.

Operation

Figure 8:
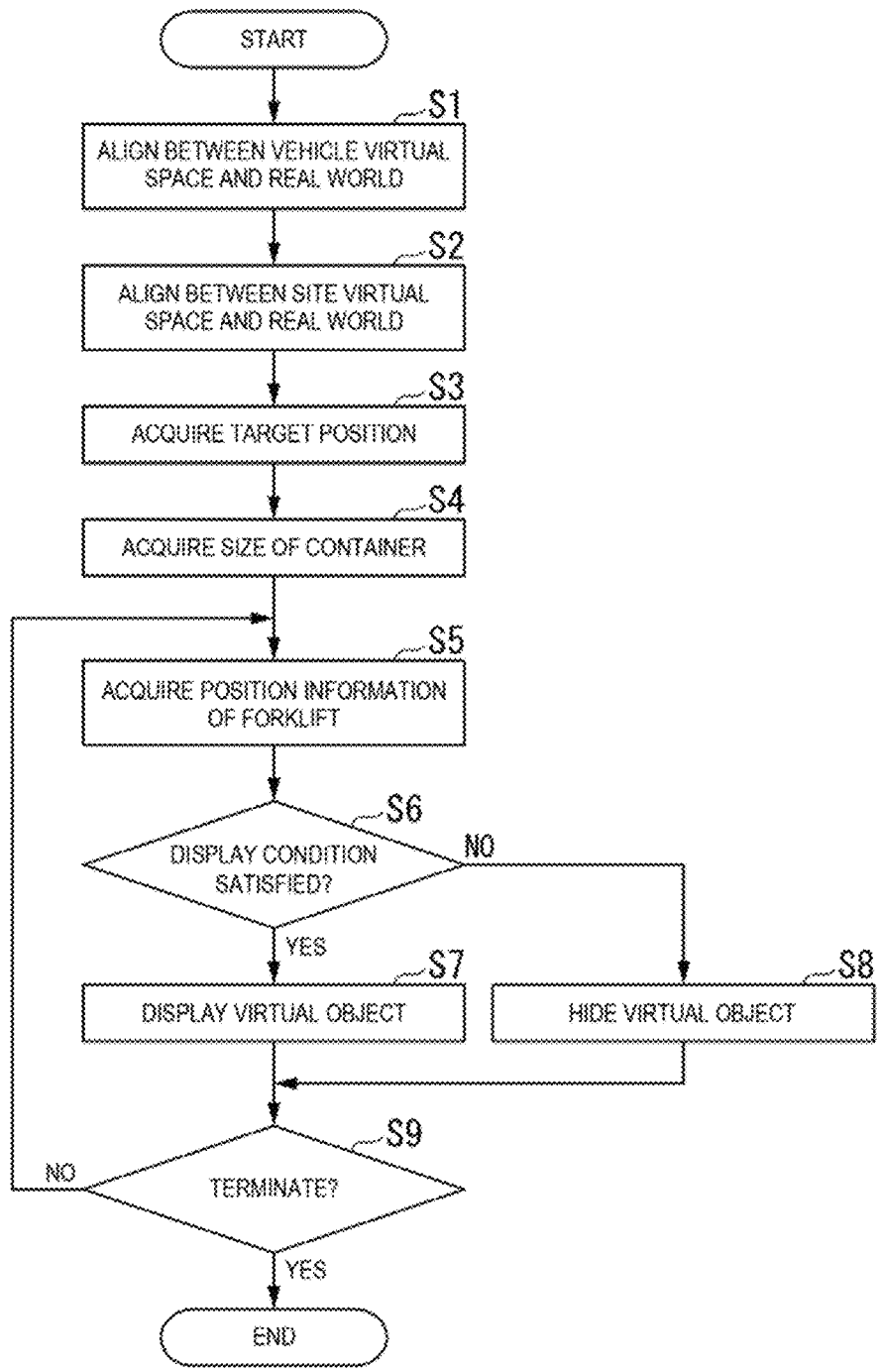
FIG. 8 is a flowchart illustrating an example of display processing according to the embodiment.

Next, a flow of a process of displaying the predicted placement range 301 or the like will be described with reference to FIG. 8. FIG. 8 is a flowchart illustrating an example of display control according to the embodiment.

The driver 100 wearing the display device 20 sits on the driver's seat of the forklift 1, activates the display device 20, and performs alignment between a vehicle virtual space and the real world (step S1). In the alignment between the vehicle virtual space and the real world, the positional relationship between the driver 100 and the forklift 1 is calculated. For example, the control unit 24 recognizes the steering wheel and other structures of the forklift 1 by the visible light camera of the sensor unit 21, and estimates the vehicle type of the forklift 1 from the shape and appearance of the captured steering wheel and the like. The control unit 24 retrieves CAD information corresponding to the estimated vehicle type from the CAD information recorded in the storage unit 28, grasps the entire shape of the forklift 1, and performs alignment with the vehicle virtual space generated in advance. For example, the control unit 24 analyzes the image of the steering wheel captured by the visible light camera of the sensor unit 21 or measures a distance to the steering wheel with the depth sensor of the sensor unit 21 to calculate the positional relationship between the driver 100 and the steering wheel, that is, a position on the driver's seat at which the driver 100 is seated, or a height of the head of the driver 100, or the positional relationship between the driver 100 and each part of the forklift 1 (a distance in the horizontal direction, a distance in the vertical distance, and the like) from the retrieved CAD information of the forklift 1, thereby setting the position of the driver 100 in the vehicle virtual space so as to match the reality. Accordingly, for example, a distance between the driver 100 and the fork 12 can be grasped, and the predicted placement range 301 can be arranged with reference to a position in the vehicle virtual space corresponding to the position of the fork 12 in the real world. In addition, for example, a two dimensional marker may be provided at a predetermined position of the forklift 1 (for example, the driver's seat side of the mast 13), the two dimensional marker may be recognized by the sensor unit 21, and the alignment between the vehicle virtual space and the real world and the adjustment of the position of the driver 100 in the vehicle virtual space may be performed in the same manner as described above based on the positional relationship with the two dimensional marker, the vehicle type of the forklift 1 indicated by the two dimensional marker, and the CAD information of the vehicle type.

Figure 9:
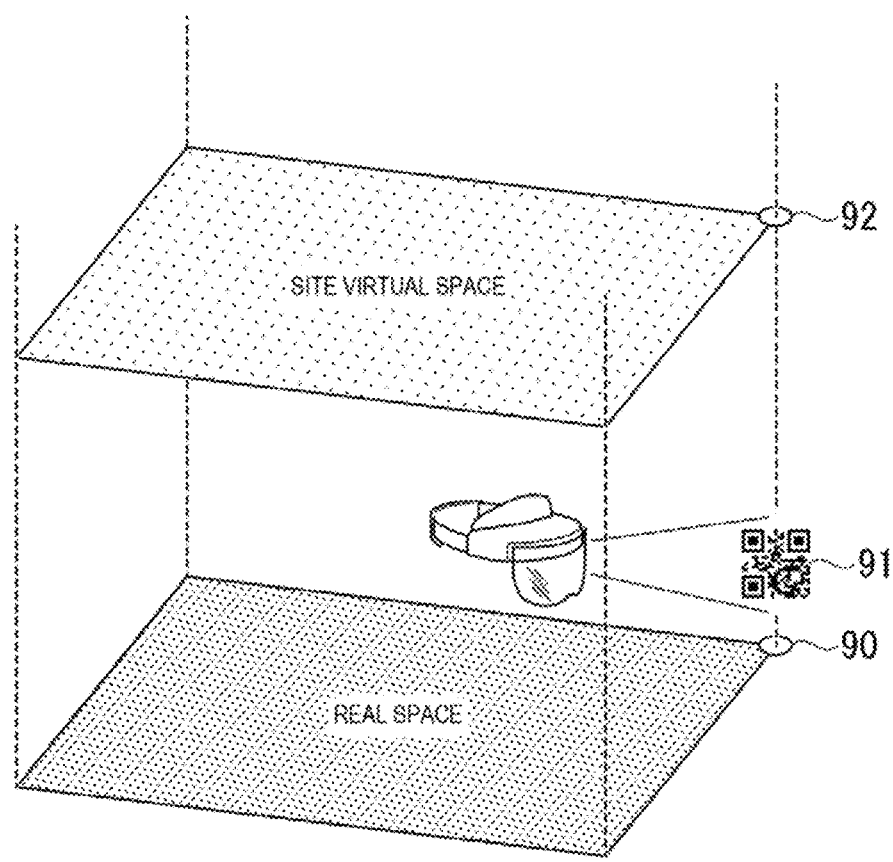
FIG. 9 is a diagram for explaining alignment between a site virtual space and the real world according to the embodiment.

Next, the control unit 24 performs alignment between the site virtual space and the real world (step S2). For example, as illustrated in FIG. 9, a marker 91 such as a QR code (registered trademark) is placed at a predetermined placement position 90 in the real world (real space). The marker 91 may be placed at a plurality of positions in a site in which a cargo handling work is performed. In addition, in the site virtual space generated in advance based on the map information of the site stored in the storage unit 28, a position 92 corresponding to the placement position 90 of the marker 91 in the real world is attached with the information indicating that the position 92 is a marker placement position. The control unit 24 captures an image of the marker 91 in the real world with the visible light camera or the like of the sensor unit 21. The marker 91 contains, for example, position information of the position of the marker 91, and the control unit 24 reads the position information of the placement position 90 of the marker 91 from the image captured by the sensor unit 21. The control unit 24 associates the position 92 in the site virtual space with the read position information. In this way, the site virtual space is aligned with the real world. In addition, the control unit 24 may associate position information of the vehicle body 10 measured by the GNSS 30a with a position in the site virtual space corresponding to a position at which the vehicle body 10 is present, and may further calculate the relative positional relationship between the vehicle body 10 and the driver 100, thereby performing alignment between the site virtual space and the real world. For example, the control unit 24 acquires position information measured at the current position by the GNSS 30a, and associates the acquired position information with a coordinate position corresponding to the position information in the site virtual space. Here, the coordinates of the site virtual space are constructed in accordance with the real world, and an arbitrary coordinate position in the site virtual space corresponds to a longitude and a latitude in the real world. Thus, by associating the position information (the longitude and latitude) of the vehicle body 10 in the real world measured by the GNSS 30a with the corresponding coordinate position in the site virtual space, it is possible to perform alignment between the vehicle body 10 and the site virtual space. Further, for example, the control unit 24 calculates a relative positional relationship between the driver 100 and a position of the vehicle body 10 at which the GNSS 30a is mounted based on the positional relationship between the driver 100 and the forklift 1 calculated in step S1, and calculates position information (the longitude and latitude) of the driver 100 using the calculated relative positional relationship. When the longitude and latitude of the driver 100 are calculated, the coordinate position of the driver 100 in the site virtual space can be calculated in the same manner as in the case of the vehicle body 10. For example, the control unit 24 calculates the longitude and latitude of the driver 100 each time position information is acquired from the GNSS 30a, and calculates the coordinate position of the driver 100 in the site virtual space each time. In this way, the control unit 24 performs the alignment between the site virtual space and the real world using the position information obtained by the GNSS 30a. As a result of the alignment, by arranging the target placement range 302 at a target position in the site virtual space, the target placement range 302 is also displayed at the target position in the real world. The AR glass has a function of recognizing a surrounding environment, creating map information of the surrounding environment, and generating a virtual space. In the case of a large-sized vehicle such as the forklift 1, a positional relationship between a virtual object arranged within a certain range (for example, at the periphery of the driver's seat or the forklift 1) and the driver 100 can be automatically recognized and an object can be displayed in an appropriate range in the virtual space. However, when the virtual object is arranged out of the certain range, the positional relationship cannot be correctly reproduced. For example, when a virtual object is arranged near the steering wheel of the driver's seat and the driver 100 leans toward the steering wheel, the virtual object is displayed so as to be present near the face of the driver 100. However, when a virtual object is arranged at a position 10 m ahead of the forklift 1 and the forklift 1 is moved toward the virtual object, the virtual object 10 m ahead may move together with the movement of the forklift 1. On the other hand, in the present embodiment, a virtual space (vehicle virtual space) around the forklift 1 and a virtual space (site virtual space) outside the vehicle virtual space are prepared, and a virtual object is arranged at a desired position of the virtual object in each of the virtual spaces based on a positional relationship with the driver 100, whereby the virtual object is displayed at a desired position in the real world.

Upon completion of the alignment, the driver 100 drives the forklift 1 to load the container 300 on the fork 12. Then, the target position acquisition unit 26 acquires a target position (step S3). The control unit 24 sets a position in the site virtual space corresponding to the target position of the container 300 as a target position. The cargo size acquisition unit 27 acquires the size of the container 300 (step S4). Further, the control unit 24 acquires the position information of the forklift 1 measured by the GNSS 30a through the transmission/reception unit 23 (step S5). Upon acquisition of the position information of the forklift 1, the control unit 24 corrects a current position of the forklift 1 to a current position of the driver 100 using the positional relationship between the driver 100 and the forklift 1 obtained in step S1, and sets a position in the site virtual space corresponding to the corrected current position of the driver 100 as a current position of the driver 100. Next, the display determination unit 25 determines whether or not a display condition is satisfied for each virtual object (for example, the predicted placement range 301, the target placement range 302, and the virtual object 303) by the methods (A) to (C) described above. When the display condition is satisfied (step S6: Yes), the control unit 24 displays the virtual object that satisfies the display condition (step S7), and when the display condition is not satisfied (step S6: No), the control unit 24 hides the virtual object that does not satisfy the display condition (step S8). For example, when the forklift 1 is away from the target position, the control unit 24 displays the target placement range 302 and the virtual object 303, and hides the predicted placement range 301. For example, when the forklift 1 and the target position come close to each other within a predetermined distance, the control unit 24 displays the predicted placement range 301 and the target placement range 302, and hides the virtual object 303. Specifically, the control unit 24 calculates a target range in which the container 300 is to be placed as viewed from the driver 100 in the real world based on the positional relationship between the forklift 1 and the driver 100, the position information of the forklift 1, and the target position, and arranges the target placement range 302 in the same range as viewed from the driver 100 in the site virtual space. Further, the control unit 24 calculates a range which is predicted to be occupied by the container 300 when the container 300 is immediately unloaded as viewed from the driver 100 in the real world based on the positional relationship between the forklift 1 and the driver 100, the position information of a position at which the forklift 1 holds the container 300 (for example, L3 in FIG. 3A), and the size information of the container 300, and arranges the predicted placement range 301 in the same range as viewed from the driver 100 in the vehicle virtual space.

Next, the control unit 24 determines whether or not to terminate a function of displaying the predicted placement range 301 and the like by the cargo unloading support system 200 (step S9). For example, when the driver 100 performs an operation of terminating the function, the control unit 24 determines to terminate the function of displaying the predicted placement range 301 and the like, and otherwise determines not to terminate the function. When it is determined not to terminate the function (step S9: No), the processing in and after step S5 is repeated. On the other hand, when it is determined to terminate the function (step S9: Yes), the process flow of FIG. 8 is ended.

In the above-described embodiment, a case in which the cargo unloading support system 200 is applied to the forklift 1 has been described as an example. However, the cargo unloading support system 200 can also be applied to industrial vehicles other than a forklift, such as a power shovel, a bulldozer, a crane truck, and a reach stacker. The fork 12 of the forklift 1, a boom and a bucket of a power shovel, a bucket and an arm of a bulldozer, a boom, a jib, a hook, and the like of a crane truck are examples of a work device included in an industrial vehicle. In addition, an object such as a container, earth and sand, or debris to be conveyed or the like by the work device is an example of a cargo.

Effects

According to the present embodiment, the driver wears the AR glasses (display device 20), and the predicted placement range 301 and the target placement range 302 are displayed on a virtual section (the vehicle virtual space and the site virtual space). Accordingly, regardless of the height of the container 300, the driver 100 can perform an operation of unloading the container 300 while checking the predicted placement range in which the container 300 is to be placed when immediately unloaded and the target placement range of the container 300. In addition, since the predicted placement range 301 and the like are displayed so as to be superimposed on the real world using the AR glasses, the driver 100 does not need to check a monitor or the like at the driver's seat and can check the predicted placement range 301 and the target placement range 302 with a natural eye line.

Figure 10:
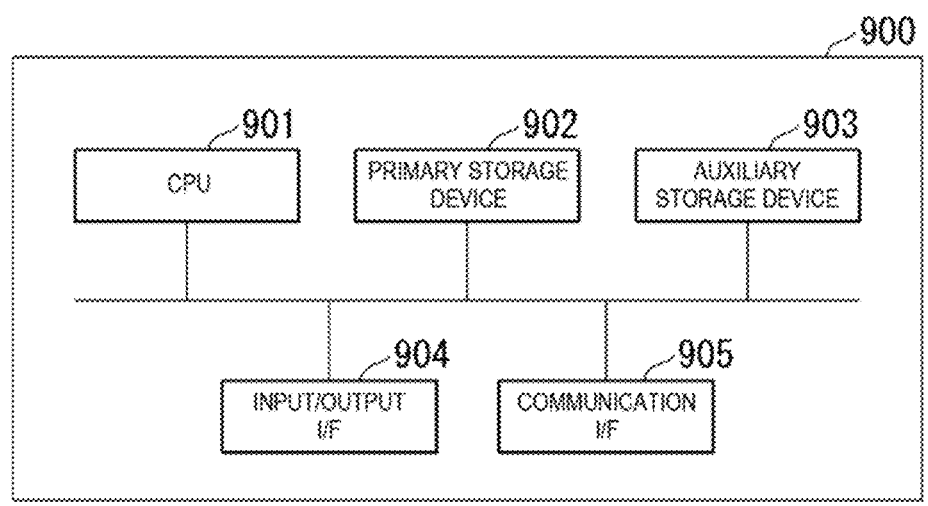
FIG. 10 is a diagram illustrating an example of a hardware configuration of a cargo unloading support system according to the embodiment.

FIG. 10 is a diagram illustrating an example of a hardware configuration of the cargo unloading support system according to the embodiment. A computer 900 includes a CPU 901, a primary storage device 902, an auxiliary storage device 903, an input/output interface 904, and a communication interface 905.

The above-described display device 20 and the management system 40 are implemented in the computer 900. The functions described above are stored in the auxiliary storage device 903 in a format of a program. The CPU 901 reads the program from the auxiliary storage device 903, loads the program in the primary storage device 902, and executes the above-mentioned processing in accordance with the program. The CPU 901 secures a storage area in the primary storage device 902 in accordance with the program. The CPU 901 secures a storage area for storing data under processing in the auxiliary storage device 903 in accordance with the program.

A program for implementing the whole or part of functions of the display device 20 and the management system 40 may be recorded in a computer readable recording medium, and a computer system may be caused to read and execute the program recorded in the recording medium, thereby executing the processing of the respective functional units. The "computer system" here includes hardware such as an operating system (OS) or peripheral equipment. In addition, if a world wide web (WWW) system is used, the "computer system" also includes a home page providing environment (or a display environment). The "computer readable recording medium" refers to a portable medium such as a CD, a DVD, or a USB, or a storage device such as a hard disk built in the computer system. Further, when this program is distributed to the computer 900 through a communication line, the computer 900 having received the distribution may load the program in the primary storage device 902 to execute the above-mentioned processing. The above-described program may implement part of the functions described above, and furthermore, also implement the functions described above in combination with a program already recorded in the computer system.

In the foregoing, certain embodiments according to the disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

SUPPLEMENTARY NOTES

The display device, the cargo unloading support system, the industrial vehicle, the control method, and the program described in each embodiment are understood as follows, for example.

(1) A display device according to a first aspect is a display device worn on a head of a person, the display device including: a display unit having transparency and being capable of displaying image data: a target position acquisition unit acquiring target position information, the target position information being position information of a conveyance destination of a cargo conveyed by an industrial vehicle: a position information acquisition unit acquiring vehicle position information, the vehicle position information being position information of the industrial vehicle or the person boarding the industrial vehicle: and a control unit displaying the image data, the image data including a target placement range of the cargo as viewed from the person based on information of a positional relationship between the person boarding the industrial vehicle and the industrial vehicle, the vehicle position information, and the target position information, and a predicted placement range of the cargo when the cargo is unloaded from the industrial vehicle as viewed from the person based on the information of the positional relationship, information of a position at which the industrial vehicle holds the cargo, and information of a size of the cargo, the image data being displayed such that the target placement range included in the image data is superimposed on the target placement range in a real world viewable through the display unit.

A cargo unloading work can be facilitated by displaying the predicted placement range of the cargo when the cargo is unloaded from the industrial vehicle and the target placement range as a target.

(2) A display device according to a second aspect is the display device of (1), wherein the control unit displays the image data when a distance between the industrial vehicle and the conveyance destination falls within a predetermined range.

By displaying the image data when cargo unloading is performed, it is possible to prevent the image data from interfering with the driver's field of view:

(3) A display device according to a third aspect is the display device of (1) or (2), wherein the control unit displays the image data when the cargo is loaded on the industrial vehicle.

Accordingly, the image data can be hidden when the cargo is not conveyed. As a result, it is possible to prevent the driver's field of view from being interfered with.

(4) A display device according to a fourth aspect is the display device of any one of (1) to (3), wherein the control unit displays the image data when a bottom surface of the cargo held by a work device included in the industrial vehicle becomes horizontal to a ground.

In unloading the cargo, a tilted mast is returned to a vertical state and then the cargo is unloaded. By displaying the image data in this state, it is possible to prevent the image data from interfering with the driver's field of view during the work until then.

(5) A display device according to a fifth aspect is the display device of any one of (1) to (4), wherein the control unit displays a virtual operation unit that receives an instruction to switch between displaying and hiding the image data, and switches between displaying and hiding the image data based on an operation performed by the person on the operation unit.

Accordingly, it is possible to perform control such that the image data is not displayed in a situation in which the image data interferes with the driver.

(6) A display device according to a sixth aspect is the display device of any one of (1) to (5), wherein when the image data is not displayed, the control unit displays a second image data giving a guidance to a position of the conveyance destination.

By performing the display for giving a guidance to a target position, the driver can drive the industrial vehicle toward the target position even in a situation in which the cargo is not unloaded.

(7) A display device according to a seventh aspect is the display device of any one of (1) to (6), further including a size acquisition unit estimating a size of the cargo, wherein the control unit calculates the target placement range based on the size estimated.

Accordingly, it is possible to calculate the target placement range according to the size of the cargo.

(8) A display device according to an eighth aspect is the display device of any one of (1) to (7), further including a size acquisition unit acquiring a size of the cargo, wherein the control unit calculates the target placement range based on the size acquired.

Accordingly, it is possible to calculate the target placement range according to the size of the cargo.

(9) A cargo unloading support system according to a ninth aspect includes: a positioning device measuring position information of the industrial vehicle or the person boarding the industrial vehicle: and the display device of any one of (1) to (8).

(10) An industrial vehicle according to a tenth aspect includes the cargo unloading support system of (9).

(11) A control method according to an eleventh aspect is a control method for a display device worn on a head of a person, the display device including a display unit, the display unit having transparency and being capable of displaying image data, the control method including: a step of acquiring target position information, the target position information being position information of a conveyance destination of a cargo conveyed by an industrial vehicle: a step of acquiring vehicle position information, the vehicle position information being position information of the industrial vehicle or the person boarding the industrial vehicle: and a step of displaying the image data, the image data including a target placement range of the cargo as viewed from the person based on information of a positional relationship between the person boarding the industrial vehicle and the industrial vehicle, the vehicle position information, and the target position information, and a predicted placement range of the cargo when the cargo is unloaded from the industrial vehicle as viewed from the person based on the information of the positional relationship, information of a position at which the industrial vehicle holds the cargo, and information of a size of the cargo, the image data being displayed such that the target placement range included in the image data is superimposed on the target placement range in a real world viewable through the display unit.

(12) A program according to a twelfth aspect is a program for a computer of a display device worn on a head of a person, the display device including a display unit, the display unit having transparency and being capable of displaying image data, the program causing the computer to function as: a unit configured to acquire target position information, the target position information being position information of a conveyance destination of a cargo conveyed by an industrial vehicle: a unit configured to acquire vehicle position information, the vehicle position information being position information of the industrial vehicle or the person boarding the industrial vehicle; and a unit configured to display the image data, the image data including a target placement range of the cargo as viewed from the person based on information of a positional relationship between the person boarding the industrial vehicle and the industrial vehicle, the vehicle position information, and the target position information, and a predicted placement range of the cargo when the cargo is unloaded from the industrial vehicle as viewed from the person based on the information of the positional relationship, information of a position at which the industrial vehicle holds the cargo, and information of a size of the cargo, the image data being displayed such that the target placement range included in the image data is superimposed on the target placement range in a real world viewable through the display unit.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A display device worn on a head of a person, the display device comprising:
    a display having transparency and being capable of displaying image data;
    a target position acquisition unit configured to acquire target position information, the target position information being position information of a conveyance destination of a cargo conveyed by an industrial vehicle;
    a position information acquisition unit configured to acquire vehicle position information, the vehicle position information being position information of the industrial vehicle or the person boarding the industrial vehicle; and
    a control unit configured to display the image data, the image data including
    a target placement range of the cargo as viewed from the person based on information of a positional relationship between the person boarding the industrial vehicle and the industrial vehicle, the vehicle position information, and the target position information, and
    a predicted placement range of the cargo when the cargo is unloaded from the industrial vehicle as viewed from the person based on the information of the positional relationship, information of a position at which the industrial vehicle holds the cargo, and information of a size of the cargo,
    the image data being displayed such that the target placement range included in the image data is superimposed on the target placement range in a real world viewable through the display.

2. The display device according to claim 1, wherein the control unit displays the image data when a distance between the industrial vehicle and the conveyance destination falls within a predetermined range.

3. The display device according to claim 1, wherein the control unit displays the image data when the cargo is loaded on the industrial vehicle.

4. The display device according to claim 1, wherein the control unit displays the image data when a bottom surface of the cargo held by a work device included in the industrial vehicle becomes horizontal to a ground.

5. The display device according to claim 1, wherein the control unit displays a virtual operation unit configured to receive an instruction to switch between displaying and hiding the image data, and switches between displaying and hiding the image data based on an operation performed by the person on the virtual operation unit.

6. The display device according to claim 1, wherein when the image data is not displayed, the control unit displays a second image data giving a guidance to a position of the conveyance destination.

7. The display device according to claim 1, further comprising
a size acquisition unit configured to estimate a size of the cargo, wherein
the control unit calculates the target placement range based on the size estimated.

8. The display device according to claim 1, further comprising
a size acquisition unit configured to acquire a size of the cargo, wherein
the control unit calculates the target placement range based on the size acquired.

9. A cargo unloading support system comprising:
a positioning device configured to measure position information of the industrial vehicle or the person boarding the industrial vehicle; and
the display device according to claim 1.

10. An industrial vehicle comprising the cargo unloading support system according to claim 9.

11. A control method for a display device worn on a head of a person, the display device including a display, the display having transparency and being capable of displaying image data, the control method comprising:
acquiring target position information, the target position information being position information of a conveyance destination of a cargo conveyed by an industrial vehicle;
acquiring vehicle position information, the vehicle position information being information of the industrial vehicle or the person boarding the industrial vehicle; and
displaying the image data, the image data including
a target placement range of the cargo as viewed from the person based on information of a positional relationship between the person boarding the industrial vehicle and the industrial vehicle, the vehicle position information, and the target position information, and
a predicted placement range of the cargo when the cargo is unloaded from the industrial vehicle as viewed from the person based on the information of the positional relationship, information of a position at which the industrial vehicle holds the cargo, and information of a size of the cargo,
the image data being displayed such that the target placement range included in the image data is superimposed on the target placement range in a real world viewable through the display.

12. A non-transitory computer readable storage medium storing a program for a computer of a display device worn on a head of a person, the display device including a display, the display having transparency and being capable of displaying image data, the program causing the computer to function as:
a unit configured to acquire target position information, the target position information being position information of a conveyance destination of a cargo conveyed by an industrial vehicle;
a unit configured to acquire vehicle position information, the vehicle position information being position information of the industrial vehicle or the person boarding the industrial vehicle; and
a unit configured to display the image data, the image data including
a target placement range of the cargo as viewed from the person based on information of a positional relationship between the person boarding the industrial vehicle and the industrial vehicle, the vehicle position information, and the target position information, and
a predicted placement range of the cargo when the cargo is unloaded from the industrial vehicle as viewed from the person based on the information of the positional relationship, information of a position at which the industrial vehicle holds the cargo, and information of a size of the cargo,
the image data being displayed such that the target placement range included in the image data is superimposed on the target placement range in a real world viewable through the display.

* * * * *